US012583138B2

(12) United States Patent
Kim

(10) Patent No.: US 12,583,138 B2
(45) Date of Patent: Mar. 24, 2026

(54) RAZOR ASSEMBLY INCLUDING LIGHT SOURCE UNIT AND REFLECTIVE SURFACE

(71) Applicant: DORCO CO., LTD., Yongin-si (KR)

(72) Inventor: Kyo Sun Kim, Seoul (KR)

(73) Assignee: Dorco Co., Ltd., Yongin-si (KR)

( * ) Notice: Subject to any disclaimer, the term of this patent is extended or adjusted under 35 U.S.C. 154(b) by 0 days.

(21) Appl. No.: 19/058,542

(22) Filed: Feb. 20, 2025

(65) Prior Publication Data

US 2025/0269547 A1 Aug. 28, 2025

(30) Foreign Application Priority Data

Feb. 22, 2024 (KR) ........................ 10-2024-0025992

(51) Int. Cl.

| | |
|---|---|
| ***B26B 21/46*** | (2006.01) |
| ***B26B 21/22*** | (2006.01) |
| ***B26B 21/40*** | (2006.01) |
| ***B26B 21/52*** | (2006.01) |
| ***F21V 3/04*** | (2018.01) |
| ***F21V 7/00*** | (2006.01) |
| ***F21V 33/00*** | (2006.01) |

(52) U.S. Cl.

CPC ............ *B26B 21/46* (2013.01); *B26B 21/225* (2013.01); *B26B 21/521* (2013.01); *B26B 21/526* (2013.01); *F21V 3/049* (2013.01); *F21V 7/0008* (2013.01); *F21V 33/0004* (2013.01); *F21V 33/004* (2013.01); *B26B 21/405* (2013.01)

(58) Field of Classification Search

CPC ... B26B 21/225; B26B 21/405; B26B 21/521; B26B 21/526

See application file for complete search history.

(56) References Cited

U.S. PATENT DOCUMENTS

| | | | | | |
|---|---|---|---|---|---|
| 2,309,035 | A * | 1/1943 | Beam | B26B 21/46 | 362/115 |
| 5,582,476 | A * | 12/1996 | Hansen | B26B 21/46 | 362/115 |
| 8,650,763 | B2 * | 2/2014 | Howell | B26B 21/522 | 30/527 |
| 2008/0010834 | A1 * | 1/2008 | Oglesby | B26B 21/46 | 30/34.05 |
| 2008/0028616 | A1 * | 2/2008 | Kwak | B26B 21/46 | 362/115 |
| 2021/0008744 | A1 * | 1/2021 | Chang | B26B 21/521 | |

* cited by examiner

*Primary Examiner* — Keith G. Delahoussaye

(74) *Attorney, Agent, or Firm* — Knobbe, Martens, Olson & Bear, LLP

(57) ABSTRACT

A razor assembly is proposed. The assembly may include a razor cartridge including a blade housing configured to longitudinally accommodate at least one razor blade each having a cutting edge. The razor cartridge may include a cartridge top surface where the cutting edge is exposed and a cartridge bottom surface opposite to the cartridge top surface. The assembly may also include a razor handle connected to the razor cartridge, the razor handle including a light source unit configured to emit light from one side of the razor handle. The light emitted from the light source unit may be reflected by a reflective surface included in the razor cartridge and may be emitted to the outside at the cartridge top surface.

15 Claims, 6 Drawing Sheets

RAZOR ASSEMBLY INCLUDING LIGHT SOURCE UNIT AND REFLECTIVE SURFACE

CROSS REFERENCE TO RELATED APPLICATION

This application claims priority to Korean Patent Application No. 10-2024-0025992, filed in Korea on Feb. 22, 2024, which is incorporated herein by reference in its entirety.

BACKGROUND

Technical Field

The present disclosure relates to a razor assembly.

Description of Related Technology

Generally, a razor assembly, which is known as a wet razor, includes a razor cartridge and a razor handle. Recently, research is being actively conducted on ways to improve shaving performance by assisting the function of a razor blade along with the razor blade included in the cartridge.

SUMMARY

One aspect is a razor assembly that may provide a user with an extensive range of clear visual information about the skin area to be shaved before shaving begins.

Another aspect is a razor assembly, comprising: a razor cartridge comprising a blade housing configured to longitudinally accommodate at least one razor blade each having a cutting edge, the razor cartridge comprising a cartridge top surface where the cutting edge is exposed and a cartridge bottom surface opposite the cartridge top surface; and a razor handle connected to the razor cartridge, the razor handle comprising a light source unit configured to emit light from one side of the razor handle, wherein the light emitted from the light source unit is reflected by a reflective surface included in the razor cartridge and is emitted to the outside at the cartridge top surface.

As described above, according to an embodiment of the present disclosure, there is a benefit of providing a user with an extensive range of clear visual information about the skin area to be shaved before shaving begins.

DETAILED DESCRIPTION

Figure 1:
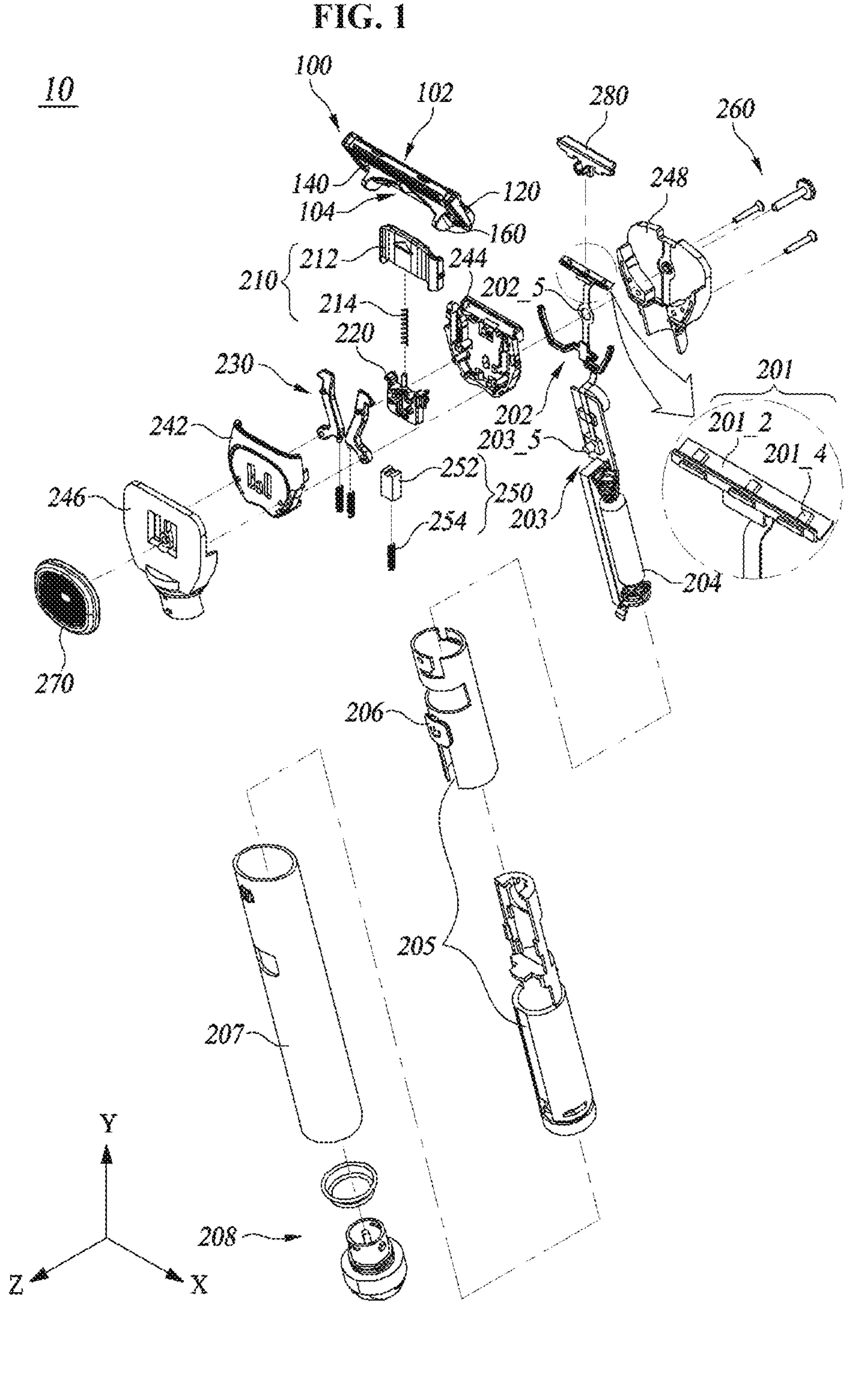
FIG. 1 is an exploded perspective view of a razor assembly according to an embodiment of the present disclosure.

A user of a wet razor may hold the razor handle in his/her hand and cut body hair by contacting the razor cartridge to the skin and stroking the same.

In this case, since the razor blade included in the cartridge comes into direct contact with the skin, irritation is applied to the skin where the body hair to be cut is positioned. Accordingly, a user may be required to perform skilled work, such as not shaving a specific area or changing a shaving direction, depending on the condition of a skin area subject to shaving.

However, due to the structure of the razor assembly, it is difficult for a user to know at first hand the part where the razor blade will contact the skin during shaving, so it is very difficult for the user to avoid shaving certain areas of the skin or to perform shaving in a different way.

In particular, when a user shaves a part where the skin is highly curved and a shadow is formed, such as under the chin, clear visual information about the part needs to be provided. For example, when the user is able to visually check the sensitive condition of the skin before contacting the razor cartridge to the skin, skin irritation may be prevented by assisting the user in determining how much and whether to press the razor cartridge against the skin.

In addition, when precise shaving is required, such as shaving small areas such as under the nose and around the edges of the lips, or trimming sideburns, it is important to allow a user to see exactly which part of the skin the razor blade will be shaving.

Accordingly, there is a need for a razor assembly that may provide a user with an extensive range of clear visual information about the skin area to be shaved before shaving begins.

Hereinafter, some embodiments of the present disclosure will be described in detail with reference to the accompanying drawings. It is to be noted that in giving reference numerals to components of each of the accompanying drawings, the same components will be denoted by the same reference numerals even though they are illustrated in different drawings. Further, in describing exemplary embodiments of the present invention, well-known functions or constructions will not be described in detail since they may unnecessarily obscure the understanding of the present invention.

Terms 'first', 'second', i), ii), a), b), and the like, will be used in describing components according to embodiments of the present disclosure. These terms are only for distinguishing the components from other components, and the nature, sequence, order, or the like of the components are not limited by the terms. Throughout the present specification, unless explicitly described to the contrary, "including" or "comprising" any components will be understood to imply the inclusion of other elements rather than the exclusion of any other elements.

FIG. 1 is an exploded perspective view of a razor assembly 10 according to an embodiment of the present disclosure.

Figure 2:
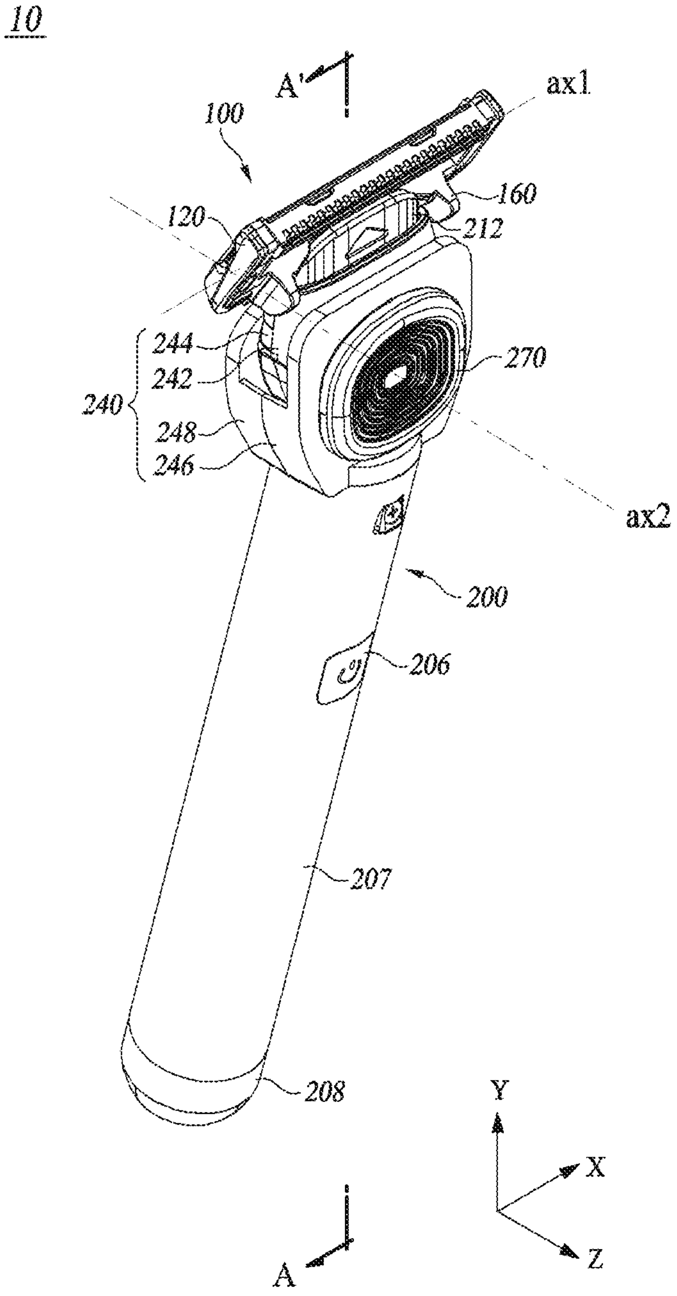
FIG. 2 is a coupled perspective view of the razor assembly according to an embodiment of the present disclosure.

FIG. 2 is a coupled perspective view of the razor assembly 10 according to an embodiment of the present disclosure.

Figure 3:
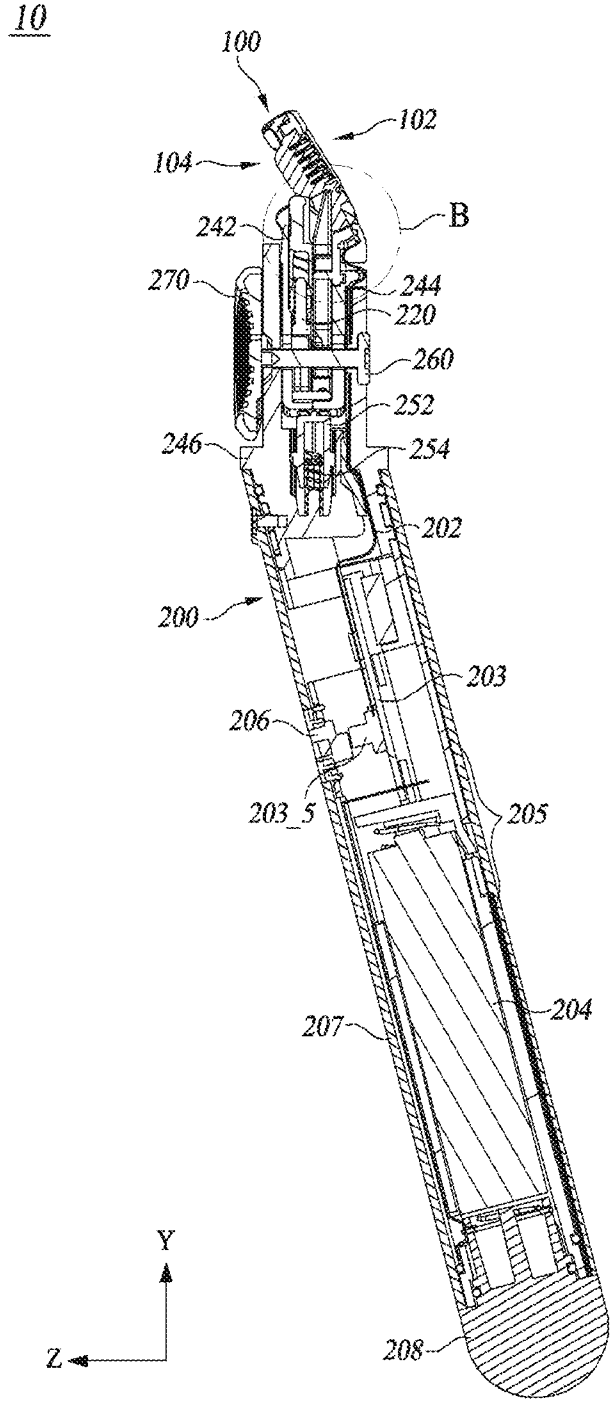
FIG. 3 is a side cross-sectional view of the razor assembly of FIG. 2, taken in a direction of A-A'.

FIG. 3 is a side cross-sectional view of the razor assembly 10 of FIG. 2, taken in a direction of A-A'.

Figure 4:
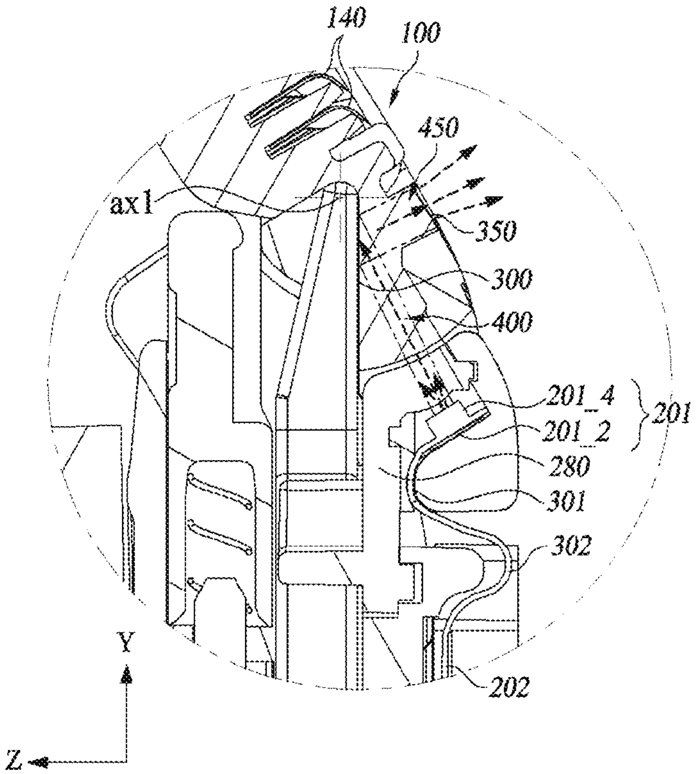
FIG. 4 is an enlarged view of part B in the side cross-sectional view of FIG. 3.

FIG. 4 is an enlarged view of part B in the side cross-sectional view of FIG. 3.

Figure 5:
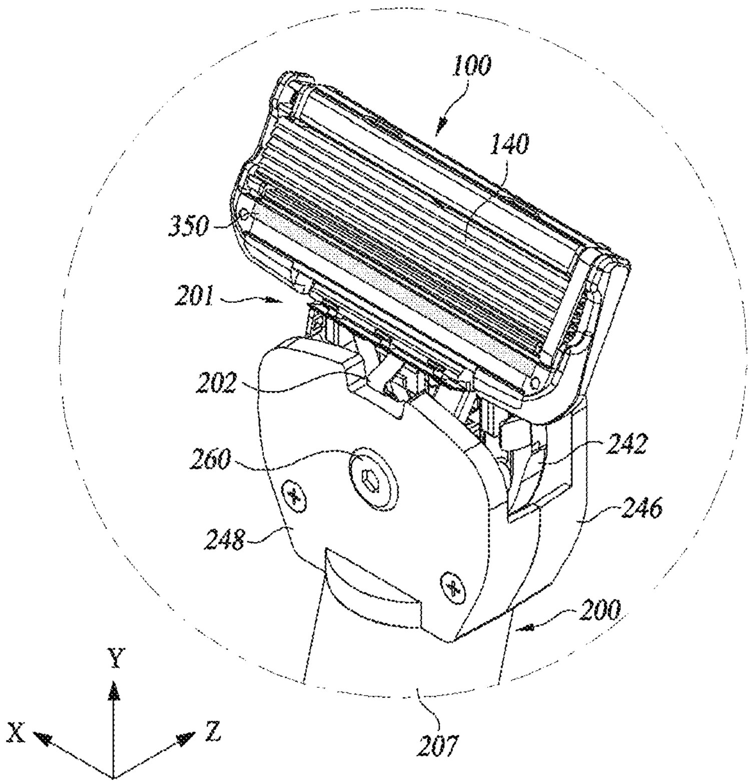
FIG. 5 is a diagram illustrating a light source unit and light emitting area in the razor assembly of FIG. 2 with a portion of a connecting head omitted.

FIG. 5 is a diagram illustrating a light source unit 201 and light emitting area 350 in the razor assembly 10 of FIG. 2 with a portion of a connecting head 242 and 244 omitted.

Referring to FIGS. 1 to 5, the razor assembly 10 according to an embodiment of the present disclosure includes all or part of a razor cartridge 100, a connector 160, and a razor handle 200.

The razor cartridge 100 includes a blade housing 120 configured to longitudinally accommodate at least one razor blade 140, each having a cutting edge (not shown). Herein, the longitudinal direction may refer to a length direction of the razor cartridge 100. For example, the longitudinal direction may be parallel to the X-axis based on FIGS. 1, 2, and 5.

The surface where the cutting edge is exposed on the razor cartridge 100 may be defined as a cartridge top surface 102, and the surface opposite to the cartridge top surface 102 may be defined as a cartridge bottom surface 104.

The connector 160 may be coupled to one side of the blade housing 120. For example, the connector 160 may be manufactured as a separate member from the blade housing 120 and then mounted on the blade housing 120. In this case, the connector 160 may be fixed to the blade housing 120 or may be pivotally connected to the blade housing 120.

Alternatively, the connector 160 may be formed to extend from one side of the blade housing 120 and be manufactured integrally with the blade housing 120. In this case, the connector 160 may be formed by injecting from a bottom surface 104 of the blade housing 120, but is not necessarily limited thereto.

In addition, the connector 160 may be disposed on at least a portion of the bottom surface 104 of the blade housing 120, excluding the area where the razor blade 140 is disposed. Preferably, the connector 160 may be disposed at front of the razor blade 140 with respect to a shaving direction, but is not necessarily limited thereto. The connector 160 may be disposed on at least a portion of the area where the razor blade 140 is disposed on the bottom surface 104 of the blade housing 120, and may be disposed at rear of the razor blade 140 with respect to the shaving direction.

The razor handle 200 includes a light source unit 201 connected to the razor cartridge 100 and configured to emit light from one side of the razor handle 200. The light emitted from the light source unit 201 may be reflected by a reflective surface 300 included in the razor cartridge 100 and emitted to the outside at the cartridge top surface 102.

In this case, the reflective surface 300 may be positioned inside the razor cartridge 100 and not exposed to the outside, and accordingly, the light incident on the reflective surface 300 and the light reflected and emitted from the reflective surface 300 may not be emitted to the outside until reaching the cartridge top surface 102.

In addition, in order to prevent the light from being emitted to the outside until reaching the cartridge top surface 102, the space through which light may pass from the light source unit 201 to the reflective surface 300 and from the reflective surface 300 to the cartridge top surface 102 may be maintained in a sealed state without cracking.

For proper reflection, the reflective surface 300 may be provided with a reflective member such as a mirror, or the surface of the reflective surface 300 may be coated or a special pattern may be formed. However, an embodiment of the present disclosure is not necessarily limited thereto.

Referring to FIG. 4, the reflective surface 300 is illustrated as a plane perpendicular to a height direction perpendicular to the longitudinal direction, for example, a direction parallel to the Z-axis of FIG. 4, but is not necessarily limited thereto. For example, the reflective surface 300 may be configured of a curved surface, or may be a surface including both a curved surface and a flat surface.

In the drawing, the razor cartridge 100 is illustrated as including one reflective surface 300, but the reflective surface 300 does not necessarily have to be configured of one, and may be configured of a plurality of reflective surfaces 300 depending on structural factors of the razor assembly 10. When the razor cartridge 100 includes the plurality of reflective surfaces, light emitted from the light source unit 201 may be reflected by the number of the plurality of reflective surfaces and be emitted to the outside at the cartridge top surface 102.

In addition, when the channel extending from one side of the light source unit 201 to the reflective surface 300 is referred to as a first light channel 400, and the channel extending from the reflective surface 300 to the cartridge top surface 102 is referred to as a second light channel 450, the light emitted from the light source unit may move along the first light channel 400 and the second light channel 450.

In FIG. 4, it is illustrated that the reflective surface 300 is configured of one and there are two light channels 400 and 450. However, when the reflective surface 300 is configured in a plural number, additional light channels may be disposed between the first light channel 400 and the second light channel 450.

In addition, the center of the first light channel 400 and the center of the second light channel 450 may not be positioned on the same line. When viewed from one longitudinal side of the razor cartridge 100, an extension direction of the first light channel 400 and an extension direction of the second light channel 450 may not be the same.

The razor assembly 10 according to an embodiment of the present disclosure is configured so that the light emitted from the light source unit 201 is reflected on the reflective surface 300 of the razor cartridge 100 and emitted to the outside of the razor cartridge 100. The light emitted from the light source unit 201 does not necessarily have to be directed directly toward the cartridge top surface 102.

Accordingly, by including the reflective surface 300 in the razor cartridge 100, the razor assembly 10 according to an embodiment of the present disclosure may have a greater degree of freedom in design in disposing the light source unit 201.

In addition, light emitted to the outside from the cartridge top surface 102 may provide high visibility to a user when touching the skin of the user. Accordingly, the user may clearly recognize the skin area to be shaved before shaving begins.

The light touching the skin of a user not only provides the user with visual information about the area to be shaved, but in some cases may also provide various cosmetic effects to the skin of the user.

The razor cartridge 100 may include the light emitting area 350 disposed at front of the at least one razor blade 140 with respect to the shaving direction. In this case, the light emitted from the light source unit 201 may be emitted to the outside through the light emitting area 350.

For example, referring to FIG. 5, the light emitting area 350 may be disposed ahead of the frontmost razor blade with respect to the shaving direction of the at least one razor blade 140, thereby allowing a user to receive clearer visual information about the area to be shaved before shaving begins.

The light emitting area 350 may include a transparent material to better emit light, and the intensity of the emitted light may be adjusted depending on the degree of transparency of the light emitting area 350. The transparent material includes a component that may remove dead skin cells, so the light emitting area 350 may perform the function of removing dead skin cells.

However, the light emitting area 350 does not necessarily include a transparent material so that light is emitted through the transparent material, and the light emitting area 350 is an area open in the height direction without a transparent material and may be configured to emit light reflected by the reflective surface 300.

The light emitted from the light source unit 201 may be configured to be reflected by the reflective surface 300 and be emitted from the entire area of the light emitting area 350, but is not necessarily limited to this, and may be configured to be emitted only from a portion of the light emitting area 350. In this case, the light emitting area 350 may include an area where light is emitted and an area where light is not emitted.

In addition, the razor handle 200 may further include a cover unit 280, at least portion of which is disposed at front of the light source unit 201 with respect to a direction in which the light is emitted from the light source unit. Referring to FIG. 4, the light emitted from the light source unit 201 may be diffused from the light source unit 201 and then aligned in a direction parallel to or convergent to any direction through the cover unit 280. Herein, convergence includes not only cases where light is concentrated toward a certain focus, but also cases where light diverges but the degree of divergence becomes smaller compared to the initial incident direction. The light passing through the cover unit 280 may be reflected by the reflective surface 300 and then diffused and emitted through the light emitting area 350. In FIG. 4, the light passing through the cover unit 280 and the light reflected on the reflective surface 300 are shown with a single arrow. However, this merely shows a representative light path by way of example, and the light passing through the cover unit 280 and the light reflected on the reflective surface 300 may appear as a plurality of light paths that are parallel or converge in one direction.

Since the light emitted from the light source unit 201 may be aligned in a direction parallel to or convergent to any one direction while passing through the first light channel 400 and the second light channel 450, the light transmission efficiency up to the light emitting area 350 may be increased.

A pattern may be formed on at least one surface of the light emitting area 350, and light passing through the light emitting area 350 may be emitted in various directions depending on the pattern formed. For example, in order to improve shaving efficiency, the surface pattern of the light emitting area 350 may be configured to narrowly focus light in a specific area or spread widely, and depending on the characteristics of shaving, the surface pattern may be uniform or of various types.

Since the light aligned in one direction by the cover unit 280 may spread through the light emitting area 350, the light may be emitted to a wider range of skin areas. For example, referring again to FIG. 5, a longitudinal width of the second light channel 450 on a side adjacent to the cartridge top surface 102 may be greater than a longitudinal width of the first light channel 400 on a side adjacent to the light source unit 201.

However, the light emitted from the light source unit 201 does not necessarily have to be diffused by the light emitting area 350, and it is also possible to diffuse the light by adjusting the degree of curvature of the reflective surface 300. For example, the reflective surface 300 may be configured to be flat, but may also be configured to be curved to form a predetermined angle, or may be configured to be convex upward or downward.

The light source unit 201 included in the razor handle 200 may include a first circuit board 201_2 including a support surface, and a light emitting unit 201_4 disposed on the support surface and electrically connected to the first circuit board 201_2.

For example, the first circuit board 201_2 may be relatively long in the longitudinal direction, and the light emitting unit 201_4 may include a plurality of LEDs (Light Emitting Diodes), but is not limited thereto.

Additionally, the razor handle 200 may include a grip portion 207, a connecting portion 202, a bottom cap 208, and a head portion 240.

The grip portion 207 may include a second circuit board 203 that is electrically connected to a power supply unit 204.

Herein, a switch unit 203_5 may be disposed on the second circuit board 203. A button unit 206 may be disposed on one side of the grip portion 207 so that the power supply unit 204 may supply power when a user presses the button unit 206. However, the power supply method of the power supply unit 204 is not necessarily limited to the aforementioned method.

The position of the button unit 206 is not necessarily limited to the position illustrated in FIGS. 1 to 3, and may be positioned at one end of the grip portion 207 adjacent to the bottom cap 208, and may be positioned at a bottom surface of the bottom cap 208.

In addition, when the button unit 206 is pressed again after power is supplied, the power supply may be cut off, or the power supply may be configured to be automatically cut off after a preset time has elapsed after power has been supplied.

The connecting portion 202 may electrically connect the second circuit board 203 and the light source unit 201. In this case, the power supplied from the power portion 204 may be transmitted to the light emitting unit 201_4 through the second circuit board 203, the connecting portion 202, and the first circuit board 201_2 in that order. The connecting portion 202 is preferably a circuit board configured of at least a portion of a flexible material in order to secure structural design freedom for other components, but is not necessarily limited thereto.

At least a portion of the power supply unit 204, the second circuit board 203, and the connecting portion 202 may be protected by being accommodated in an accommodation housing 205 disposed within the grip portion 207, but is not necessarily limited thereto.

The bottom cap 208 may be detachably connected to one end of the grip portion 207. When the life of the power supply unit 204 has expired, a user may replace the configuration of the power supply unit 204 by separating the bottom cap 208 from the grip portion 207 in a direction parallel to the extension direction of the grip portion 207. However, the power supply unit 204 does not necessarily have to be configured to be replaceable, and the power supply unit 204 may be configured to be charged in a wired or wireless manner while accommodated in the grip portion 207.

The head portion 240 may accommodate at least a portion of the connecting portion 202, one side of which may be connected to the grip portion 207 and the other side of which may be connected to the razor cartridge 100. In this case, the light source unit 201 may be positioned on one side of the head portion 240, and more specifically, at least a portion of the light source unit 201 is supported by the head portion 240 so that the position of the light source unit 201 may be fixed to the head portion 240.

Hereinafter, with further reference to FIG. 6, technical features of the razor assembly 10 according to an embodiment of the present disclosure will be described in detail.

Figure 6:
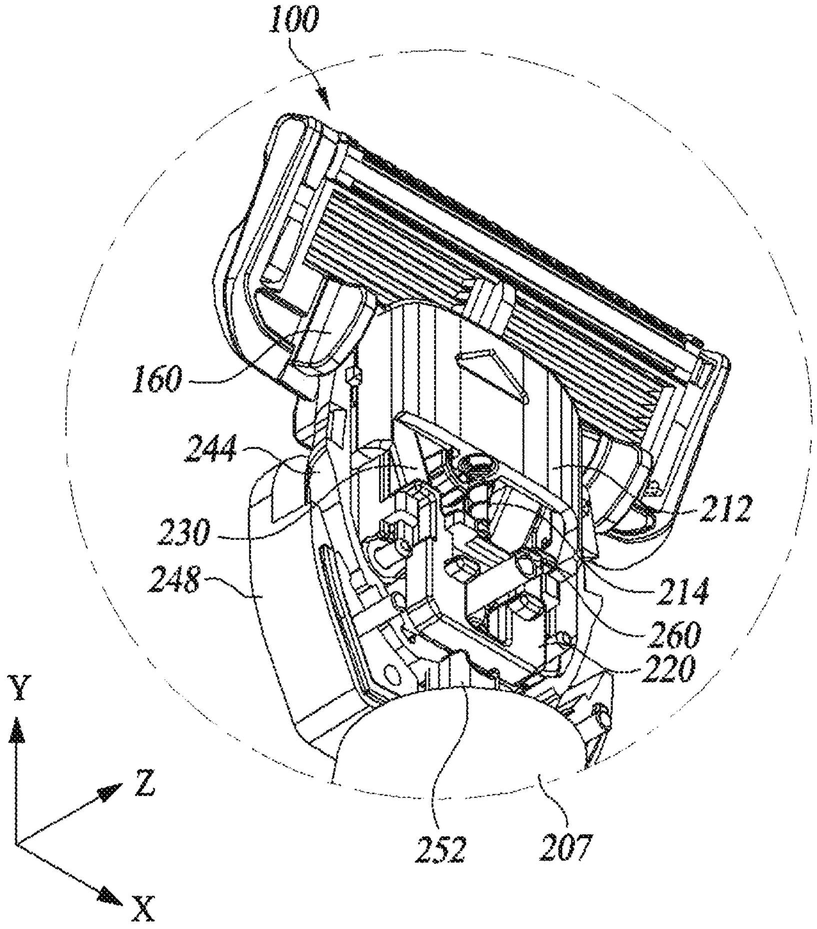
FIG. 6 is a diagram illustrating internal configurations of a head adapter and the connecting head in the razor assembly of FIG. 2 with a portion of the head adapter and the connecting head omitted.

FIG. 6 is a diagram illustrating internal configurations of a head adapters 246 and 248 and the connecting heads 242 and 244 in the razor assembly 10 of FIG. 2 with a portion of the head adapters 246 and 248 and the connecting heads 242 and 244 omitted.

Referring to FIGS. 1 to 6, the razor handle 200 may further include a first restoring force providing portion 210, a coupling unit 230, an ejecting unit 220, and a second restoring force providing portion 250.

In addition, at least a portion of each of the first restoring force providing portion 210, the ejecting unit 220, the coupling unit 230, and the second restoring force providing portion 250 may be included within the head portion 240. More specifically, a portion of the first restoring force providing portion 210 may protrude from one side of the head portion 240, and the ejecting unit 220, the coupling unit 230, and the second restoring force providing portion 250 may be disposed inside the head portion 240.

The razor cartridge 100 is pivotable about a first pivot axis ax1 parallel to the longitudinal direction with respect to the razor handle 200.

In this case, the first restoring force providing portion 210 may be configured to provide a restoring force used to restore the razor cartridge 100 to a first neutral position when the razor cartridge 100 pivots around the first pivot axis ax1. Herein, the first neutral position refers to a position in which the razor cartridge 100 is not pivoted about the first pivot axis ax1.

In the first neutral position, the razor cartridge may be pivoted in the range of 20° to 60°, and preferably in the range of 32° to 50°, with respect to the direction parallel to the Y-axis direction of FIG. 3.

Referring to FIG. 4, the first pivot axis ax1 may be disposed between the light source unit 201 and the at least one razor blade 140.

In the case where the light emitted from the light source unit 201 is not reflected but is directly emitted to the outside of the razor cartridge 100, the light source unit 201 may be disposed adjacent to the rear of the light emitting area 350 with respect to the direction in which the light is emitted.

The razor assembly 10 according to an embodiment of the present disclosure is configured to indirectly emit light emitted from the light source unit 201 to the outside of the razor cartridge 100 using the reflective surface 300, the position of the light source unit 201 may be freely set. Accordingly, with respect to the shaving direction, the light source unit 201 may be disposed ahead of the first pivot axis ax1, and the first pivot axis ax1 may be positioned close to the front of the at least one razor blade 140. Accordingly, a smoother pivoting feeling of the razor cartridge 100 may be provided.

Referring to FIGS. 3 and 4, when the razor cartridge 100 pivots around the first pivot axis ax1, the angle formed by the reflective surface 300 with the first circuit board 201_2 varies, and accordingly, the amount of light reaching the cartridge top surface 102 may also vary.

A user generally brings the razor cartridge 100 close to the skin in front of a mirror to perform shaving. In this case, the user uses the light emitted from the razor cartridge 100 to check the shaving area of the at least one razor blade 140. In this case, the cartridge top surface 102 is spaced apart from the skin, and in this state, the razor cartridge 100 is in the first neutral position. Accordingly, in order to improve the perception of a user of the position of the shaving area, there is a need for the largest amount of light to be emitted from the razor cartridge 100 when in the first neutral position. Accordingly, the amount of light emitted to the outside from the cartridge top surface 102 may be greatest in the first neutral position.

In this case, in the first neutral position, the first circuit board 201_2 may be perpendicular to the cartridge top surface 102, and accordingly, when the light emitted from the light source unit 201 is reflected on the reflective surface 300, a relatively large amount of light may reach the cartridge top surface 102.

The first restoring force providing portion 210 may include a first plunger 212 and a first elastic member 214. In this case, the first plunger 212 is configured to transmit a restoring force through a cam action with the razor cartridge 100, and the first elastic member 214 is configured to provide an elastic force to the first plunger 212. Herein, when the direction in which the first elastic member 214 and the first plunger 212 are coupled is referred to as a coupling direction, the coupling direction may mean the positive Y-axis direction in FIGS. 1 to 6.

For example, when the razor cartridge 100 pivots about the first pivot axis ax1, the first plunger 212 may be configured to move in the Y-axis direction of FIGS. 1 to 6 according to pivot about the first pivot axis ax1 of the razor cartridge 100. In addition, the first elastic member 214 may be configured to contract when the first plunger 212 moves in a negative Y-axis direction. In this case, the first elastic member 214 may provide a restoring force in a positive Y-axis direction to the first plunger 212.

The coupling unit 230 may be configured to be coupled to the connector 160, and in this case, the first pivot axis ax1 may pass through one end of the coupling unit 230 in a coupling direction or may be in contact with the end. For example, the coupling unit 230 may be configured to include two arms and two elastic members, but is not necessarily limited thereto.

The ejecting unit 220 is configured to separate the coupling unit 230 from the connector 160. For example, in the case where the coupling unit 230 includes two arms, when moving in a coupling direction, the ejecting unit 220 may be configured to narrow the longitudinal distance between the two arms or to elastically deform the two arms. The coupling unit 230 may be separated from the connector 160 by narrowing the longitudinal distance between the two arms or elastically deforming the two arms.

The movement of the ejecting unit 220 in the coupling direction may be possible by a user moving an operating unit 270 coupled to the ejecting unit 220 on the outside of the head portion 240 in the positive Y-axis direction.

In addition, one end of the first elastic member 214 is connected to the rear end of the first plunger 212 with respect to the coupling direction, and the other end is connected to the ejecting unit 220, so that when the ejecting unit 220 moves in the coupling direction, the first elastic member 214 may provide a restoring force to the ejecting unit 220.

Although not shown in the drawing, when the razor cartridge 100 pivots about the first pivot axis ax1, it is also possible to configure the power supply unit 204 and the switch unit 203_5 to be spaced apart by the first restoring force providing portion 210 and/or the ejecting unit 220, or to block power transmission to the connecting portion 202. In this case, unnecessary power consumption during the shaving process may be reduced.

The head portion 240 may include the connecting head 242 and 244 and the head adapters 246 and 248. One side of the connecting heads 242 and 244 may be connected to the razor cartridge. The head adapters 246 and 248 may be connected to one side of the grip portion 207 and are configured to surround at least a portion of the connecting heads 242 and 244. In this case, at least a portion of the light source unit 201 may be supported by one side of the connecting heads 242 and 244 that are relatively more adjacent to the razor cartridge 100.

In FIG. 1, the connecting heads 242 and 244 are illustrated as including an upper head 242 and a lower head 244, and the head adapters 246 and 248 are illustrated as including an upper adapter 246 and a lower adapter 248, but is not necessarily limited thereto. The connecting heads 242 and 244 and/or the head adapters 246 and 248 may be configured in a single form in which the upper and lower portions of each are coupled.

The connecting heads 242 and 244 may be pivotable about a second pivot axis ax2, which is a direction perpendicular to the longitudinal direction with respect to the head adapters 246 and 248. In other words, the razor assembly 10 according to an embodiment of the present disclosure may provide not only pivot about the first pivot axis ax1 but also pivot around the second pivot axis ax2. Herein, the second pivot axis may refer to a direction parallel to the Z axis in, for example, FIGS. 1 to 6.

In order to pivot the connecting heads 242 and 244 about the second pivot axis ax2 with respect to the head adapters 246 and 248, the head adapters 246 and 248 and the connecting heads 242 and 244 may be fastened by at least one fastening member 260, in which case the at least one fastening member 260 may penetrate the head adapters 246 and 248, the connecting portion 202, and the connecting heads 242 and 244.

In order for the at least one fastening member 260 to penetrate the connecting portion 202, the connecting portion 202 may include a through hole 202_5.

In this case, when the connecting heads 242 and 244 pivot about the second pivot axis ax2, the second restoring force provider 250 is configured to provide a restoring force to restore the connecting heads 242 and 244 to the second neutral position. Herein, the second neutral position means a position in which the connecting heads 242 and 244 are not pivoted about the second pivot axis ax2.

For the design freedom of the head portion 240 and the setting of the light emitting direction of the light source unit 201, at least a part of the connecting portion 202 may include a first bending area 302 and a second bending area 301.

For example, referring to FIG. 4, when viewed from one side in the longitudinal direction, the first bending area 302 may be formed to be convex downward, and the second bending area 301 may be formed to be convex upward.

At least a portion of the connecting heads 242 and 244 may be formed to be convex downward when viewed from one longitudinal side in order to couple with the head adapters 246 and 248 or accommodate the internal components of the connecting heads 242 and 244. In this case, in the second neutral position, at least a portion of the connecting heads 242 and 244 may be positioned at an upper portion of the first bending area 302 with respect to a direction parallel to the second pivot axis ax2. As the connecting portion 202 includes the first bending area 302, the design freedom of the connecting heads 242 and 244 may be increased.

In addition, when the connecting heads 242 and 244 pivot about the second pivot axis ax2 with respect to the head adapters 246 and 248, the connecting portion 202 may be freely folded or unfolded using the first bending area 302 and/or the second bending area 301. As a result, the electrical connection between the first circuit board 201_2 and the second circuit board 203 may be smoothly maintained regardless of the degree of pivot of the connecting heads 242 and 244 about the second pivot axis ax2.

However, the connecting portion 202 does not necessarily have to be configured to fold or unfold according to pivot about the second pivot axis ax2 of the connecting heads 242 and 244. It is also possible to dispose the connecting portion 202 so as not to interfere with the pivot of the connecting heads 242 and 244 about the second pivot axis ax2.

The connecting heads 242 and 244 may be configured to support at least a portion of the light source unit 201 so that the light emitted from the light source unit 201 is directed toward the reflective surface 300. In this case, at least a portion of the connecting heads 242 and 244 may be configured to support the connecting portion 202 at a lower portion of the second bending area 301 with respect to a direction parallel to the second pivot axis ax2. Since the connecting part 202 includes the second bending area 301, the light emitted from the light source unit 201 may be directed to the reflective surface 300.

In addition, the connecting portion 202 may be configured to connect the first bending area 302 and the second bending area 301 to each other. For example, the second bending area 301 may be formed immediately after the first bending area 302 is formed with respect to the coupling direction. Accordingly, the support of the connecting heads 242 and 244 with respect to the connecting portion 202 may be made more stable, and the connecting portion 202 may be prevented from moving in the height direction relative to the connecting heads 242 and 244 and/or the head adapters 246 and 248.

The second restoring force providing portion 250 may include a second plunger 252 and a second elastic member 254. In this case, the second plunger 252 is configured to transmit a restoring force through a cam action with the connecting heads 242 and 244, and the second elastic member 254 provides an elastic force to the second plunger 252.

For example, when the connecting heads 242 and 244 pivot about the second pivot axis ax2, the second plunger 252 may be configured to move in the Y-axis direction of FIGS. 1 to 6 according to pivot about the second pivot axis ax2 of the razor cartridge 100. In addition, the second elastic member 254 may be configured to contract when the second plunger 252 moves in a negative Y-axis direction. In this case, the second elastic member 254 may provide a restoring force in a positive Y-axis direction to the second plunger 252.

Although not shown in the drawing, when the connecting heads 242 and 244 pivot around the second pivot axis ax2, it is also possible to configure the power supply unit 204 and the switch unit 203_5 to be spaced apart by the second restoring force providing portion 250, or to block power transmission to the connecting portion 202. In this case, unnecessary power consumption during the shaving process may be reduced.

The spirit of the present embodiment is illustratively described hereinabove. It will be appreciated by those skilled in the art to which the present embodiment pertains that various modifications and alterations may be made without departing from the essential characteristics of the present embodiment. Accordingly, the present embodiments are not to limit the spirit of the present embodiment, but are to describe the spirit of the present embodiment. The technical idea of the present embodiment is not limited to these embodiments. The scope of the present embodiment should be interpreted by the following claims, and it should be interpreted that all the spirits equivalent to the following claims fall within the scope of the present embodiment.

What is claimed is:

1. A razor assembly, comprising:

a razor cartridge comprising a blade housing configured to longitudinally accommodate at least one razor blade each having a cutting edge, the razor cartridge comprising:

a cartridge top surface where the cutting edge is exposed, and a cartridge bottom surface opposing the cartridge top surface; and a razor handle connected to the razor cartridge, the razor handle comprising a light source unit configured to emit light from one side of the razor handle, wherein:

the light emitted from the light source unit is configured to be reflected by a reflective surface included in the razor cartridge and is configured to be emitted to the outside at the cartridge top surface, the razor cartridge comprises a light emitting area disposed at a front of the at least one razor blade with respect to a shaving direction;

the light emitted from the light source unit is configured to be emitted to the outside through the light emitting area; and the light emitting area comprises a transparent material.

2. The razor assembly of claim 1, further comprising a cover unit, at least a portion of which is disposed at a front of the light source unit with respect to a direction in which the light is emitted from the light source unit, wherein:

the light emitted from the light source unit is configured to be diffused from the light source unit and then aligned in a direction parallel to or convergent to any one direction through the cover unit; and the light passing through the cover unit is configured to be reflected by the reflective surface and then diffused and emitted through the light emitting area according to a pattern formed on at least one surface of the light emitting area.

3. The razor assembly of claim 1, wherein the reflective surface is positioned inside the razor cartridge.

4. The razor assembly of claim 1, further comprising:

a first light channel extending from one side of the light source unit to the reflective surface; and a second light channel extending from the reflective surface to the cartridge top surface, wherein:

the light emitted from the light source unit is configured to move along the first light channel and the second light channel; and a longitudinal width of the second light channel on a side adjacent to the cartridge top surface is greater than a longitudinal width of the first light channel on a side adjacent to the light source unit.

5. The razor assembly of claim 1, further comprising:

a first light channel extending from one side of the light source unit to the reflective surface; and a second light channel extending from the reflective surface to the cartridge top surface, wherein the center of the first light channel and the center of the second light channel are not positioned on the same line.

6. The razor assembly of claim 1, further comprising:

a first light channel extending from one side of the light source unit to the reflective surface; and a second light channel extending from the reflective surface to the cartridge top surface, wherein, when viewed from one longitudinal side, an extension direction of the first light channel and an extension direction of the second light channel are different from each other.

7. The razor assembly of claim 1, wherein the razor handle further comprises:

a grip portion comprising a second circuit board that is electrically connected to a power supply unit;

a connecting portion configured to electrically connect the second circuit board and the light source unit; and a head portion configured to accommodate at least a portion of the connecting portion, one side of which is connected to the grip portion, and the other side of which is connected to the razor cartridge, and wherein the light source unit is positioned on one side of the head portion.

8. The razor assembly of claim 7, wherein the head portion comprises:

a connecting head, one side of which is connected to the razor cartridge; and a head adapter connected to one side of the grip portion and configured to surround at least a portion of the connecting head, and wherein the connecting head is pivotable about a second pivot axis in a direction perpendicular to a longitudinal direction with respect to the head adapter.

9. The razor assembly of claim 8, wherein:

the head adapter and the connecting head are fastened by a fastening member; and the fastening member penetrates the head adapter, the connecting portion, and the connecting head.

10. The razor assembly of claim 8, wherein at least a portion of the light source unit is supported by the connecting head.

11. The razor assembly of claim 8, wherein:

at least a portion of the connecting portion comprises a first bending area that is convex downward when viewed from one longitudinal side, and when the position at which the connecting head does not pivot about the second pivot axis is referred to as a second neutral position, at least a portion of the connecting head is positioned at an upper portion of the first bending area with respect to a direction parallel to the second pivot axis in the second neutral position.

12. The razor assembly of claim 8, wherein:

at least a portion of the connecting portion comprises a second bending area that is convex upward when viewed from one longitudinal side; and at least a portion of the connecting head supports the connecting portion at a lower portion of the second bending area with respect to a direction parallel to the second pivot axis.

13. A razor assembly, comprising:

a razor cartridge comprising a blade housing configured to longitudinally accommodate at least one razor blade each having a cutting edge, the razor cartridge comprising:

a cartridge top surface where the cutting edge is exposed, and a cartridge bottom surface opposing the cartridge top surface; and a razor handle connected to the razor cartridge, the razor handle comprising a light source unit configured to emit light from one side of the razor handle, wherein:

the light emitted from the light source unit is configured to be reflected by a reflective surface included in the razor cartridge and is configured to be emitted to the outside at the cartridge top surface, the razor cartridge is pivotable about a first pivot axis parallel to a longitudinal direction with respect to the razor handle, and when the position at which the razor cartridge does not pivot about the first pivot axis is referred to as a first neutral position, the amount of light emitted to the outside at the cartridge top surface is greatest in the first neutral position.

14. The razor assembly of claim 13, wherein the first pivot axis is disposed between the light source unit and the at least one razor blade.

15. The razor assembly of claim 13, wherein the light source unit comprises:

a first circuit board comprising a support surface; and a light emitting unit disposed on the support surface and electrically connected to the first circuit board, and wherein the first circuit board is perpendicular to the cartridge top surface in the first neutral position.

* * * * *